United States Patent [19]

Delessard et al.

[11] Patent Number: 4,628,831
[45] Date of Patent: Dec. 16, 1986

[54] HEARTH AND PROCESS FOR FLUIDIZED-BED TREATMENT OF A FUEL

[75] Inventors: Serge L. Delessard, Fontenay-Sous/Bois; Roger M. Puff, Freyming-Merlebach; Jean C. Kita, Forbach; Ange Virgilio, Cocheren, all of France

[73] Assignee: Charbonnages de France, Paris, France

[21] Appl. No.: 726,963

[22] PCT Filed: Jan. 20, 1983

[86] PCT No.: PCT/FR83/00013
§ 371 Date: Aug. 15, 1983
§ 102(e) Date: Aug. 15, 1983

Related U.S. Application Data

[63] Continuation of Ser. No. 537,375, Aug. 15, 1983, abandoned.

[30] Foreign Application Priority Data

Jan. 20, 1982 [FR] France .................................. 82 00815

[51] Int. Cl.⁴ .............................................. F23G 5/00
[52] U.S. Cl. .................................. 110/245; 34/57 A; 122/4 D; 432/15
[58] Field of Search ................ 110/245; 122/4 D; 432/58, 15; 34/57 A

[56] References Cited

U.S. PATENT DOCUMENTS

| | | | |
|---|---|---|---|
| 3,366,080 | 1/1968 | Albertson | 110/245 |
| 3,667,133 | 6/1972 | Lincoln | 34/57 A |
| 3,914,089 | 10/1975 | Desty et al. | 34/57 A |
| 4,075,953 | 2/1978 | Sowande | 110/245 |
| 4,165,040 | 8/1979 | Beacham | 432/15 |
| 4,171,945 | 10/1979 | Lazenby | 110/245 |
| 4,290,387 | 9/1981 | DeFeo et al. | 122/4 D |
| 4,315,469 | 2/1982 | Vareide et al. | 110/245 |
| 4,340,000 | 7/1982 | Hein | 110/245 |
| 4,341,515 | 7/1982 | Kovenberg | 110/245 |
| 4,349,969 | 9/1982 | Stewart et al. | 34/57 A |
| 4,400,150 | 8/1983 | Smith et al. | 110/245 |
| 4,402,665 | 9/1983 | Kovenberg | 110/245 |
| 4,429,644 | 2/1984 | Thomas | 122/4 D |
| 4,434,726 | 3/1984 | Jones | 110/245 |
| 4,436,507 | 3/1984 | Stewart et al. | 122/4 D |
| 4,526,111 | 7/1985 | Mischke | 34/57 A |

FOREIGN PATENT DOCUMENTS

| | | | |
|---|---|---|---|
| 540598 | 1/1981 | Australia . | |
| 50518 | 4/1982 | European Pat. Off. . | |
| 50519 | 4/1982 | European Pat. Off. . | |
| 1422198 | 11/1965 | France . | |
| 2171945 | 9/1973 | France . | |
| 55-00334 | 1/1979 | Japan . | |
| 55-53616 | 4/1980 | Japan | 110/245 |
| 57-16711 | 1/1982 | Japan | 110/245 |
| 858813 | 6/1958 | United Kingdom . | |

Primary Examiner—Henry C. Yuen
Attorney, Agent, or Firm—Cushman, Darby & Cushman

[57] ABSTRACT

Hearth and process for the fluidized bed treatment of a fuel consisting of solid particles. The grid (1) for conveying gaseous fluidization and/or forcing fluid to a treatment chamber (2) comprises two separately supplied circuits of channels, respectively a first circuit of channels (11) with orifices widened towards the top, for the fluidization of a particulate material, and a second circuit of tubular channels (14), opening out above widened orifices, for forcing the particulate material.

9 Claims, 6 Drawing Figures

HEARTH AND PROCESS FOR FLUIDIZED-BED TREATMENT OF A FUEL

This is a continuation of application Ser. No. 537,375, filed Aug. 15, 1983, which was abandoned upon the filing hereof.

The present invention relates to a hearth and a process for the treatment of a fuel consisting of solid particles, which is maintained in a fluidised bed, during treatment, within a treatment chamber limited in its lower part by a grid. This grid has an assembly of gas passage channels via which there arrives a gas for fluidising, treating and, if appropriate, conveying the particles of fuel to be treated.

By treatment is meant, here, any operation which can be carried out on the fuel in the form of grains, which is maintained in a fluidised state. Gasification, combustion, etc., may be mentioned as examples of treatment.

The invention relates more particularly to a treatment hearth which comprises an upper fuel-supply means as well as a means which is likewise located above the level of the grid and which serves for discharging the treated fuel or for discharging waste or possible by-products. Thus, in a hearth with which the invention is concerned, there are, above the grid, means for the intake and discharge of the fuel, and the grid serves exclusively for the passage of channels for admission of the fluidisation and treatment gas.

The process of the invention relates to the method of supplying fluidisation and treatment gas to the hearth via the grid.

In the state of the art, French Pat. Nos. FR 1,422,198 and FR 2,171,945 are known, and these describe fluidisation gratings which incorporate orifices consisting of cavities widened towards the top and located next to one another. Such grids make it possible to adjust and ensure a regular flow of gases over the entire extent of the fluidised zone.

Japanese Pat. No. JP-55-99334 is also known, and this relates to a fluidised-bed apparatus in which a fluidisation grid has cavities widened towards the top; there terminates at this grid a first pipe line for the admission of fluidisation gas and a second assembly of spaced pipe lines which serve for supplying the grid with material to be fluidised. In this Patent, there is therefore only a single fluidisation-gas circuit.

The published European Patent Application Nos. EP-50 518 and EP-50 519 are also known, and in these there is a perforated grid in the form of a truncated cone which ends towards the bottom in a vertical discharge pipe; vertical tubes, some of which serve as ignition burners, pass through this grid. Air is conveyed through the grid either via the perforations in this or via some of the vertical tubes, but this air comes from a single air-supply circuit.

Since one of the important uses, but not the only one, of the hearth according to the invention is combustion of fuel in the form of grains, it will also be rembered that there has already been a proposal to use fluidised beds as combustion hearths. Their main advantage is that it is possible to burn various particulate fuels with a very high content of incombustible residues. On the other hand, their operating flexibility is limited.

In fact, in a fluidised-bed hearth, it is noted, when there is a constant excess of air, that the quantity of heat generated is practically proportional to the velocity of the gases passing through the fluidised bed. In a chamber equipped with a fluidisation grid working at a nominal velocity of the gases of 2.5 meters per second, it may be expected that the treatment capacity, that is to say the productivity, will be reduced in a ratio of 1 to 2 (at most 1 to 3). In contrast to this, as regards the same chamber, it is difficult to see how it is possible to double or triple the nominal productivity, by increasing the flow of fluidisation air, without creating a high velocity of the air passing through the grid and thereby causing an excessive loss of charge (the loss of charge being proportional to the square of the velocity of the gases). This would result in problems affecting:

the stability of the materials, as a result of an increase in abrasion,
the leak-proofing of the grid at high temperature under a high pressure, and a risk of deformation of this grid,
irregular behaviour of the fluidised-bed,
the power of the air-blowing appliances.

The fluidisation and/or forcing processes developed at the present time make it possible to operate within two quite separate sectors when a material consisting of particles is to be treated:

dense fluidised-beds with a velocity of the gases of 1 to 3 meters per second,
forced fluidised beds with a velocity of the gases of 6 to 8 meters per second (empty velocities, also called fluidisation velocities).

There is, at the present time, no fluidisation process which makes it possible simply to pass from one fluidisation sector to the other within one and the same apparatus.

The industrial installations planned hitherto must consequently have a design based on repetitive units with, as a corollary to this, the following disadvantages:

multiplication of the reactors and their accessories,
a constraining procedure for starting and stopping each unit,
an intermittent variation in power.

The main purpose of the invention is to propose a hearth with a chamber and with a fluidisation grid which makes it possible to avoid the above-mentioned disadvantages, possesses a high degree of operating flexibility and, in particular, makes it possible to pass easily and in a continuous, reversible and rapid manner from the sector of dense fluidised beds to the sector of forced fluidised beds.

A secondary object of the invention is to propose hearths of the above-mentioned type, which are designed for combustion and which therefore have very high operating flexibility.

These objects are achieved by means of a hearth in which the grid is supplied with fluidisation and treatment gas as a result of the combination of the first circuit and a second circuit, each having their own gas-supply source.

In this way, it is possible to obtain, in practice, via a single grid, all the intermediate operating states between that of fluidisation with a gas velocity of 1 to 3 meters per second, with only the first circuit incorporating the cavities widened towards the top being supplied with gaseous fluid, and that of forcing with a gas velocity of 6 to 8 meters per second, both circuits being supplied simultaneously with the gaseous fluid.

It is preferable to use a grid such as that described in the French Patents mentioned above, which have cavities located next to one another and widened towards the top.

In this case, the first circuit of fluidisation and treatment gas is connected to an assembly of channels with a vertical blowing direction, which open into the bottom of cavities which are located next to one another and are widened towards the top and which end in an upper orifice, these being made in the grid, whilst the second circuit is connected to channels which pass through the grid in the gaps separating the cavities and which open out above the level of this grid. In this way, the good distribution of the gaseous fluid under fluidisation conditions is not disturbed, since this preserves the entire effective cross-section of the upper part of the cavities widened towards the top, which serve to create and establish the fluidisation conditions.

It is advantageous if the channels connected to the second circuit are pipes opening out substantially above the upper level of the widened cavities. In this way, a zone is maintained underneath the outlet of these pipes, and in the event that the gaseous fluid is pulsed through these channels this zone remains subjected to the fluidisation conditions by the gaseous fluid pulsed via the widened cavities of the first circuit, such fluidisation conditions assisting the homogenisation of the mixture of particles and gaseous fluid.

According to the invention, the total cross-section of the channels of the second circuit is at least equal to the total gas passage cross-section of the channels of the first circuit. This makes it possible to ensure forcing velocities several times higher than the fluidisation velocity, in practice, at least two to three times higher.

Likewise according to the invention, the total cross-section of the upper orifice of the cavities widened towards the top is at least equal to the total cross-section of the channels of the second circuit. This ensures the best possible distribution of the gaseous fluidisation fluid over the greatest cross-section of the chamber.

Preferably, according to the invention, the channels of the second circuit end in the chamber above the grid via apertures directed transversally to the direction to the vertical blowing of the channels of the first circuit, or via upwardly open apertures underneath a cover which prevents particles from being introduced during the stop in the pulsing of gaseous fluid via the second circuit.

When the hearth according to the invention is used as a combustion hearth with a lower fixed grid, the gas which is blown via the first circuit and via the second circuit is combustion air which also ensures the fluidisation and/or forcing of the fuel consisting of grains. This fuel is introduced into the upper part of the hearth by suitable means, and the ashes are discharged by suitable means which are located at a level above the grid.

Each assembly of orifices has its own device for supplying combustion air. Preferably, these devices for supplying combustion air can be controlled independently of one another.

According to the process of the invention, a particulate material is treated in a hearth according to the invention by supplying, as desired, only the first circuit or both circuits of channels.

Preferably, the first circuit is supplied at a flow of gaseous fluid included within a range corresponding substantially to operation for fluidisation conditions of the material contained in the chamber, that is to say, ensuring, most often, a velocity of the gaseous fluid of between 1 and 3 meters per second in the said chamber when the latter is empty of particulate material.

The second circuit is operated by supplying a flow complementary to that of the first circuit, so as to obtain a total flow which corresponds substantially to operation under intermediate and/or forcing conditions of the material contained in the chamber, that is to say, ensuring, most often, a velocity of the gaseous flow of between 3 m/s and 8 m/s in the said chamber when this is empty of particulate material.

The complementary flow and/or the total flow is adjusted as a function of the actual treatment capacity desired.

Other characteristics as well as the advantages of the invention will emerge from the description, given below purely by way of example, of a preferred embodiment. Reference will be made, for this purpose to the attached drawings in which.

Figure 1:
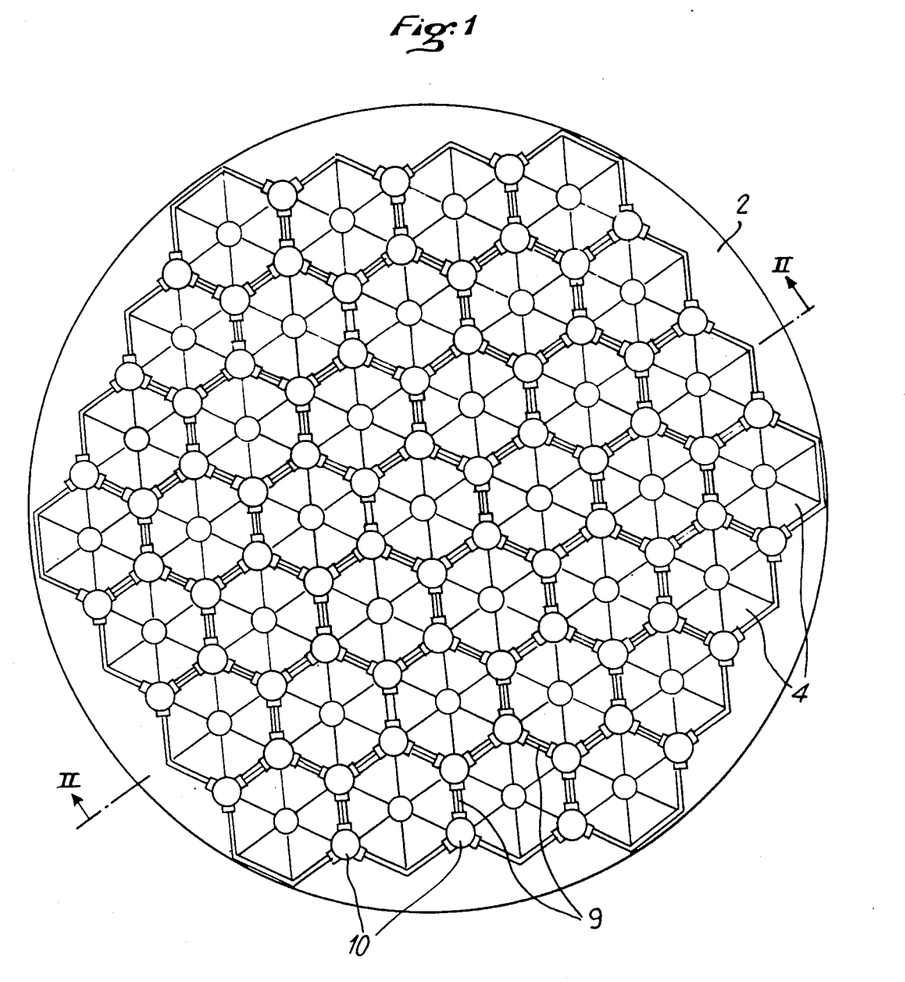
FIG. 1 is a plan view of a fixed grid of a hearth according to the invention, this grid having thirty-seven pyramids for the introduction of gaseous fluidisation fluid.
Figure 2:
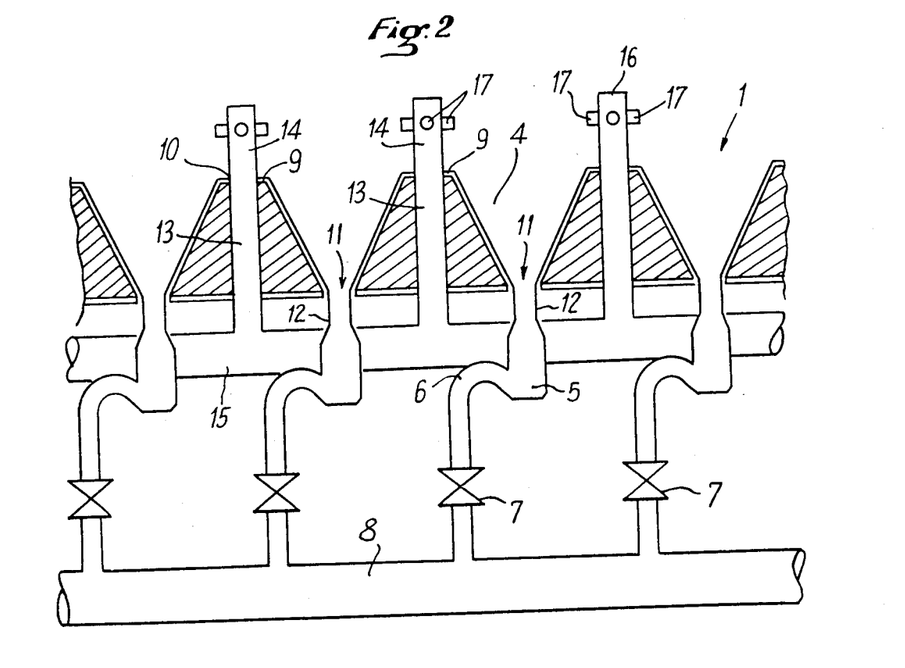
FIG. 2 is an enlarged partial section along II—II of the grid of FIG. 1.
Figure 5:
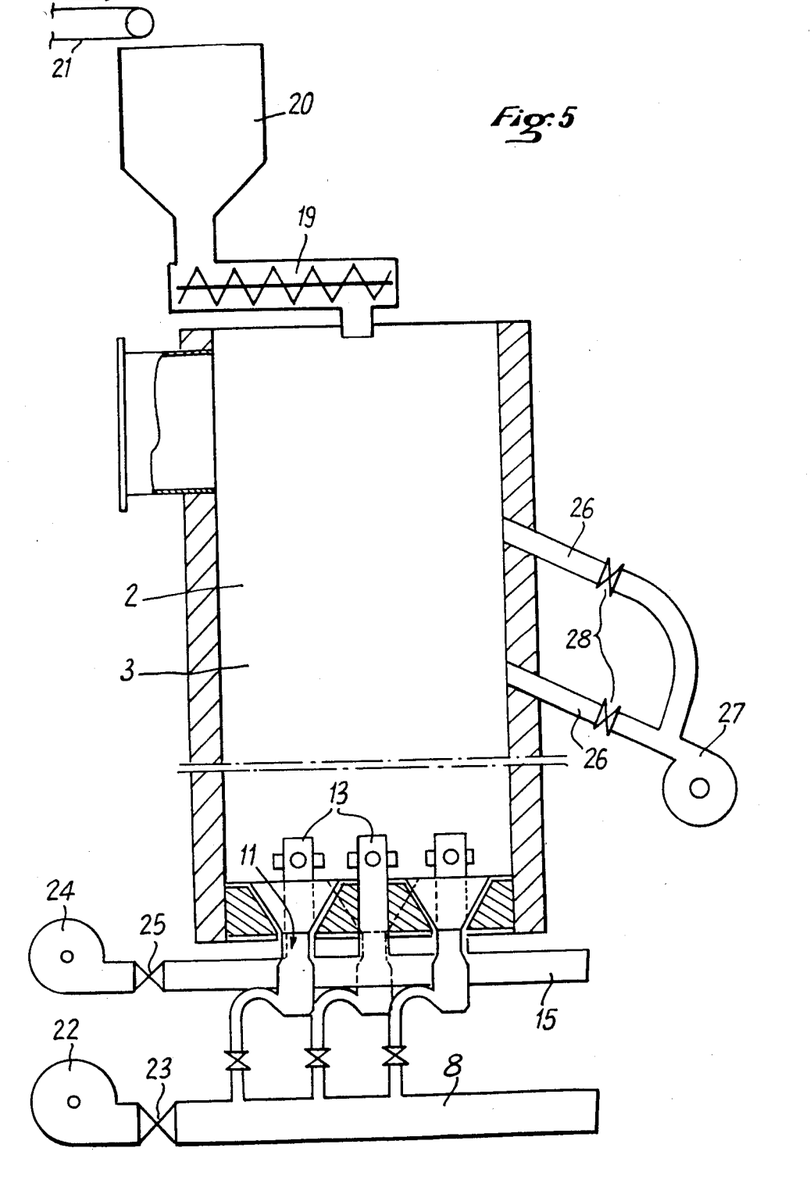
FIG. 5 is a section along a vertical plane of an entire treatment hearth according to the invention, modified to be used as a combustion hearth.

The grid 1 of FIGS. 1 and 2 intended to be installed in the lower part of a treatment chamber 2, for example a combustion hearth 3 like that in FIG. 5. To clarify the ideas, reference will be made, in fact, to the example of a combustion hearth in which the gas conveyed in the first circuit and in the second circuit is air. In another use of the treatment hearth according to the invention, the gaseous fluid could be steam, air enriched with oxygen, pure oxygen or a neutral gas containing oxygen, for example for carrying out gasification operations.

Figure 3:
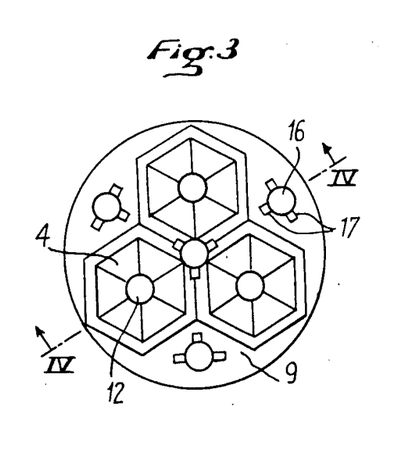
FIG. 3 is a plan view of an alternative form of the grid of a smaller hearth, this grid having only three pyramids for the introduction of gaseous fluidisation fluid.
Figure 4:
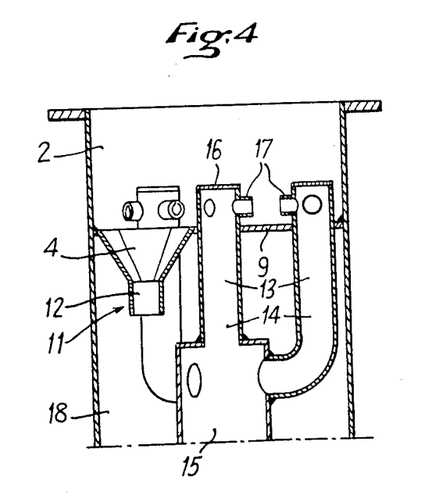
FIG. 4 is an enlarged partial section along IV—IV of the grid of FIG. 3.

The grid 1 comprises, in FIGS. 1 and 2, thirty-seven cavities in the form of truncated cones or pyramidal cavities 4 and, in FIGS. 3 and 4, 3 pyramidal cavities 4, widening upwards, each ending in an upper orifice. Each of the cavities 4 is the upper outlet of a channel 11 connected at its base 12 to a pot 5 with a syphon 6 connected to a regulating valve 7, and they are all connected in this way, each via the valve 7, the syphon 6 and the pot 5, to a main distribution pipe 8 for the gaseous fluid, which is connected to a pulsing fan not shown in FIGS. 1 to 4.

The cavities in the form of truncated cones or pyramidal cavities 4 are located next to one another and give rise, in the upper part of the grid 1, to ribs 9 of greater or lesser width. These ribs meet one another at triple junction points 10, where, according to the invention, pipes 13 constituting complementary channels 14 pass through the grid vertically, the bases of the said pipes 13 being connected to a secondary distribution pipe 15 for gaseous fluid, which is connected to a pulsing fan not shown in FIGS. 1 to 4. The pipes 13 are tubular and of substantially constant cross-section and open out above the upper plane of the pyramidal cavities 4 widened towards the top. Their upper part 16 is shut off or covered, but they open into the chamber 2 via lateral orifices 17, each having a total cross-section at most equal to the cross-section of the rising part. The total cross-section of the pipes 13 is at least equal to the total cross-section of the bases 12 of the channels 11, whilst the total cross-section of the upper orifices of the cavities in the form of truncated cones or pyramidal cavities 4 is several times greater than the total cross-section of the pipes 13.

FIGS. 3 and 4 illustrate an alternative form with three channels 11 having pyramidal cavities 4 and with four tubular pipes 13 connected to a pipe 15. Apart from the number of channels occupying the surface of this grid 2 in FIGS. 3 and 4, the only other noteworthy difference is the absence of syphons 6 and valves 7, the base 12 of the channels 11 being connected, in this case, to a single wind-box 18.

There are, in this case, a first circuit 22, 23, 8 and a second circuit 24, 25, 15 which are separate and which have their own gas-supply source 22, 24.

In a hearth according to the invention, when the grid is supplied only via the channels 11, with a widened orifice, of the first circuit 22, 23, 8, all the particulate material can be put under fluidisation conditions by being blown, in a way known per se, at a rising velocity of 1 to 3 meters per second of gaseous fluid in the chamber 2; the dead zones prejudicial to efficient operation are thereby reduced considerably, above all when there is a risk of agglutination of the particulate material. It will also be seen that, when the grid is supplied at the same time via the two assemblies of channels 11 and 14 of the two circuits, it is possible to create in the hearth conditions for forcing the particulate material above the level of the upper orifices of the channels 14.

FIG. 5 shows the use of a treatment hearth according to the invention as a hearth for powdered or sludgy solid fuel, the fuel in the form of grains arrives via an upper supply means which comprises a screw-type feeder 19 installed underneath a hopper 20 which is itself supplied via a conveyor 21. The fuel falls as a result of gravity into the treatment chamber 2. Means 21A are installed above the level of the grid to discharge the unburnt residues.

The grid is located at the base of the treatment chamber 2 which serves, in this case, as a combustion hearth 3, and into which falls the coal consisting of grains or any other powdery or sludgy fuel coming from the feeder 19. The channels 11 of the first circuit are supplied via the pipe 8 with primary combustion and fluidisation air by means of a fan 22, the delivery rate of which is adjustable directly and/or via a possible regulating valve 23. The pipe 15 serving the tubular pipes 13 of the second circuit is supplied separately with primary combustion and forcing air via a fan 24, the delivery rate of which is adjustable directly and/or via a possible regulating valve 25. When the hearth is used as a combustion hearth, there are nozzles 26 for injecting secondary air into the hearth 3; these nozzles are supplied via fan 27 and regulating valves 28.

The hearth shown in FIG. 5 was used for the combustion of Gardanne Lignite having the following characteristics:

Granulometry: 85%<10 mm; 50%<3.15 mm; 17%<1 mm; 8.5%<0.5 mm;

Humidity: 14% ashes; 35%; volatile materials: 37.9%; lower calorific value: 4130 kcal/kg.

Five tests corresponding to operating conditions indicated in the following table were conducted.

| Tests | 1 | 2 | 3 | 4 | 5 |
|---|---|---|---|---|---|
| Temperature (°C.) bed | 950 | 950 | 950 | 950 | 950 |
| Pressure (mm head of water) | | | | | |
| bottom of grid | 780 | 700 | 1285 | 990 | 1505 |
| $\Delta p$ grid | 240 | 220 | 270 | 270 | 805 |
| $\Delta p$ bed | 460 | 445 | 355 | 420 | 415 |
| Air flow ($m^3N/h$) | | | | | |
| total | 200 | 150 | 690 | 470 | 470 |
| pyramid channels | (1) | (1) | 240 | 240 | (1) |
| tubular channels (complementary air) | (1) | (1) | 450 | 230 | (1) |
| Flow of dry lignite (kg/h) | 30 | 15 | 135 | 75 | 77 |
| Fluidisation velocity (m/s) | 1.8 | 1.3 | 6.1 | 4.2 | 4.2 |

(1) A technical minimum of the order of 10 to 30 $m^3/h$ taken from the total air is introduced into the tubular channels to protect them from harmful heating, and incidentally to prevent solid particles from entering it. The rest, that is to say virtually all the air, is then conveyed into the pyramidal channels.

During these tests, the empty velocity of the combustion smoke was fixed successively at:

1.3, 1.8 and 4.2 meters per second with a technical minimum of complementary air in the tubular channels 14;

4.2 and 6.1 meters per second with the air of the pyramids ensuring a fluidisation velocity of approximately 2 meters per second, the air of the tubular channels 14 providing the complement.

The results of the tests showed that the introduction of complementary air via the tubular channels 14 makes it possible to maintain a constant loss of charge of the grid ($\Delta p$ grid), whatever the fluidisation velocity.

They also showed that it was possible for the flow of treated lignite to vary from 15 kg/h to 135 kg/h, and this could not have been achieved with a conventional fluidisation installation. Moreover, it was noted that the degree of combustion of the lignite (100−losses due to unburnt residues in %), which diminishes when the fluidisation velocity increases, nevertheless remains satisfactory (higher than 94%) for fluidisation velocities reaching 6.1 meters per second.

During another series of tests, rapid modifications in the operation speed of the hearth were carried out by varying the empty velocity of the smoke between 1 meter per second and 6 meters per second, whilst keeping constant the combustion temperature (950° C.), the loss of charge of the bed (≃400 mm head of water) and the ratio of coal to total air.

Figure 6:
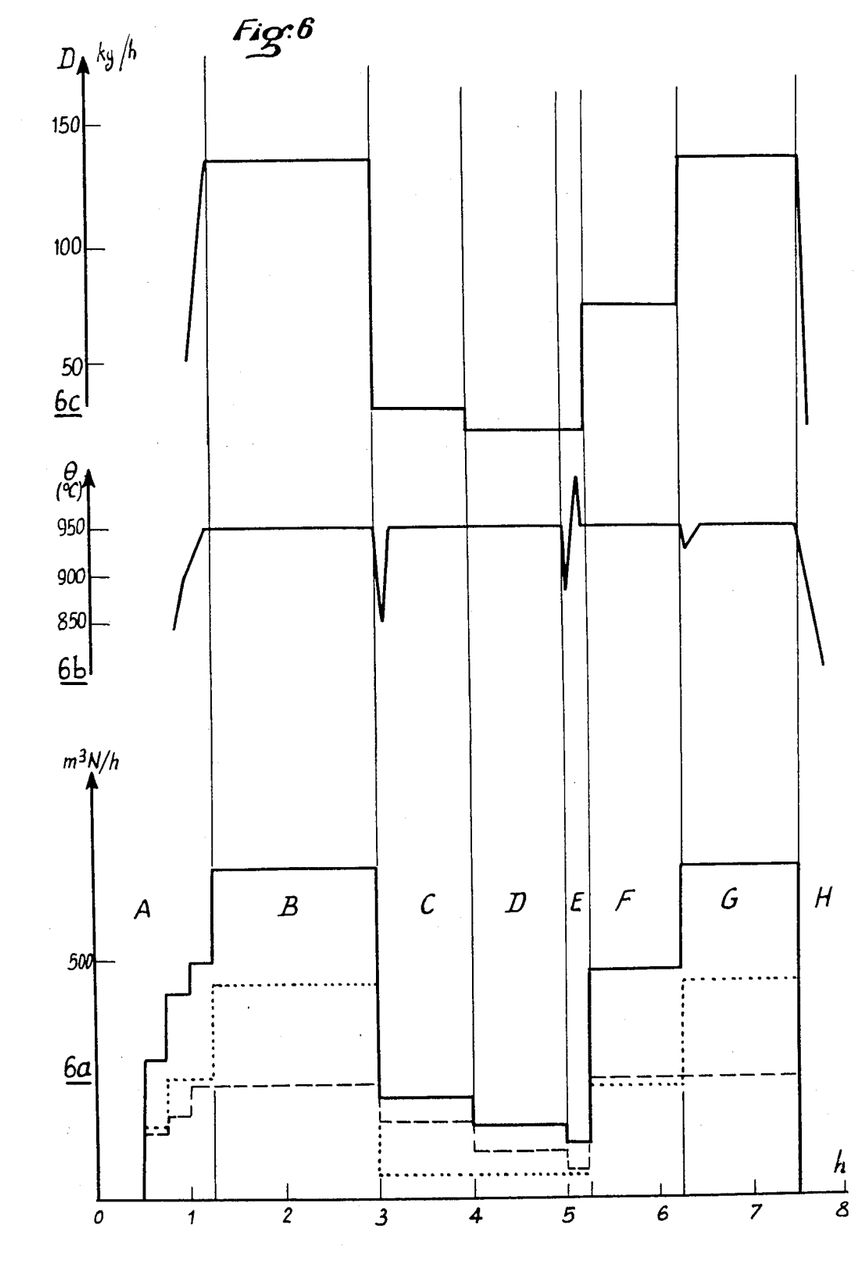
FIG. 6 shows graphs indicating the variation in the flow of 0-10 mm small coal, in the temperature and in the flow of air during tests conducted with the hearth of FIG. 5, equipped with a grid in accordance with FIGS. 1 and 2.

The results of these tests were recorded in the graphs of FIG. 6 which should be considered as forming part of the present description for their informative value. FIG. 6 represents three graphs having common scale of the abscissa in hours. The lower graph shows in the continuous line, on the ordinate axis, the instantaneous flow of total primary air expressed in $m^3N/h$, and, in a broken line, the instantaneous flow of the (fluidisation) fraction of this air introduced via the pyramidal channels, and, in a dotted line, the instantaneous flow of complementary air introduced via the tubular channels 14. The graph in the middle represents the temperature O measured in the bed, expressed in °C. The upper graph represents the instantaneous flow D of lignite introduced into the hearth (in kg/h).

Eight successive periods staggered over a total of eight hours may be distinguished on these graphs. These periods, each corresponding to imposed operating conditions, are separated on the graphs by vertical lines corresponding to the moments when the operating conditions are changed.

The period A corresponds to the starting-up of the installation.

The period B corresponds to operation under forcing conditions at 6.1 meters per second with a flow of lignite of 131 kg/h.

The period C corresponds to operation under fluidisation conditions at 1.8 meters per second with a flow of lignite of 34 kg/h.

The period D corresponds to operation under fluidisation conditions at the low speed of 1.3 meters per second with a flow of lignite of 16 kg/h.

The period E corresponds to operation under limiting velocity of 1 meter per second which has led to unstable operating conditions.

The period F corresponds to operation under intermediate conditions of 4.2 meters per second with a flow of lignite of approximately 77 kg/h.

The period G corresponds to new operation under forced conditions, as in period B.

The period H corresponds to the stopping of the tests.

After each variation in speed, the installation quickly recovered its equilbirium, generally after a transitory phase of the order of 15 minutes, linked to the manual adjustments of the installation, except as regards operation at 1 meter per second during which unstable operating conditions were observed.

Consequently, the tests conducted made it possible:
to ensure correct fluidisation with fluidisation velocities varying from 1.3 to 6.1 meters per second;
to increase the productivity of the hearth considerably, without causing an increase in the loss of charge of the grid, hence without the need for a very high delivery pressure of the blowing fans or excessive gas velocities at the level of the grid;
to burn the Gardanne lignite in a satisfactory way, even with a fluidisation velocity of 6 meters per second;
to maintain a stable loss of charge of the bed within the velocity range tested.

It goes without saying that the grid according to the invention can likewise be used in the combustion of all types of fuels, especially poor fuels or fuel with high contents of impurities, such as, for example, coal-bearing or oil shales, protroleum residues, household refuse and miscellaneous waste.

It can likewise be used for all types of fluidised bed treatments in which it is desirable to vary the productivity of the installation and the flow rate of the treated materials within wide limits.

It is also possible to introduce recycled smoke, steam or powered coal or ashes in pneumatic transport via the pipes of complementary gas.

The scope of the invention will not be exceeded by making any detailed modifications. Thus, instead of arranging pipes constituting the complementary channels of the second circuit at all the triple junction points (FIG. 1), they can merely be arranged at only a certain number of these points. Likewise, there is no need to provide lateral orifices at the top of the vertical pipes, provided that they are left open at the top and that they are equipped with covers, as is known per se.

We claim:

1. Hearth for the fluidized treatment of a fuel bed of the type including supply means for supplying fuel to an interior region of said hearth and discharge means for discharging treated fuel from the hearth, said hearth comprising:

grid means fixed to a lower portion of said hearth interior region for defining plural cavities disposed adjacent to one another, each said cavity defining upper and lower orifices, said upper orifice establishing a level of said grid means, wherein said grid means includes (a) plural first channels in fluid communication with respective ones of said lower orifices, and (b) plural second channels extending through said grid means and located adjacent respective ones of said cavities, each said second channel including means defining at least one opening vertically disposed above said level of said grid means to define therewith a fluidization zone;

first fluid circuit means connected to each said first channels to thereby establish fluid communication with each said cavity, said first fluid circuit means for supplying a first component of fluidization and treatment gas to each of said cavities so that said first component gas is discharged from each said upper orifice along a vertical blowing direction into the fuel bed; and second fluid circuit means connected to each said second channels to thereby establish fluid communication with each said opening, said second fluid circuit means for supplying a second component of fluidization and treatment gas to each of said second channels which is discharged through said openings to complement said first component gas and thus fluidize the bed in said fluidization zone, and wherein each said second channel includes means associated with said opening for directing said second component gas discharged through said associated opening along a blowing direction transverse to said vertical blowing direction of said first component gas.

2. Hearth for the fluidized treatment of a fuel bed comprising:

grid means fixed to a lower portion of said hearth for permitting a fluidization or treatment gas to be blown into the bed, said grid means including plural cavities each defining a lower orifice and having side walls upwardly and outwardly extending from said lower orifice to define an upper orifice of greater size than and vertically spaced from said lower orifice, said side walls of a grouping of adjacent ones of said cavities being adjacently connected by means of rib members disposed adjacent to said upper orifices, said rib members forming junction points between said grouping of adjacent ones of said cavities;

first fluid circuit means connected to each said lower orifice of said cavities for supplying a first component of the fluidization and treatment gas to each said cavity to discharge said first component gas into the bed along a vertical blowing direction between said lower and upper orifices; and second fluid circuit means including (a) channel means vertically extending through predetermined junction points of said rib members between said grouping of adjacent ones of said cavities and terminating in an opening vertically spaced above said upper orifices of said adjacent ones of said cavities to establish therebetween a fluidization zone, and (b) means connected to said channel means to supply a second component of the fluidization and treatment gas to said channel means, and (c) means associated with said opening for discharging said second component gas from each said opening and into said fluidization zone in a direction substantially transverse to said vertical blowing direction of said first component gas to thereby homogeneously fluidize the fuel bed in said zone.

3. Hearth for the fluidized treatment of a fuel bed of the type including supply means for supplying fuel to an interior region of said hearth and discharge means for discharging treated fuel from the hearth, said hearth comprising:

grid means fixed to a lower portion of said hearth interior region for defining plural cavities disposed adjacent to one another, each said cavity defining upper and lower orifices, said upper orifice establishing a level of said grid means, wherein said grid means includes (a) plural first channels in fluid communication with respective ones of said lower orifices, and (b) plural second channels extending through said grid means and located adjacent respective ones of said cavities, each said second channel including means defining at least one opening vertically disposed above said level of said grid means to define therewith a fluidization zone;

first fluid circuit means connected to each said first channels to thereby establish fluid communication with each said cavity, said first fluid circuit means for supplying a first component of fluidization and treatment gas to each of said cavities so that said first component gas is discharged from each said upper orifice along a vertical blowing direction into the fuel bed; and second fluid circuit means connected to each said second channels to thereby establish fluid communication with each said opening, said second fluid circuit means for supplying a second component of fluidization and treatment gas to each of said second channels which is discharged through said openings to complement said first component gas and thus fluidize the bed in said fluidization zone, wherein each said second channel includes means associated with said opening for directing said second component gas discharged through said associated opening along a blowing direction transverse to said vertical blowing direction of said first component gas, and wherein the total cross-section of said upper orifices of said cavity is at least equal to the total cross-section of said second channels of said second fluid circuit means.

4. Hearth for the fluidised-bed treatment of a fuel consisting of solid particles, comprising supply means for supplying the fuel to said hearth, a fixed lower grid means having gas passage channels for blowing a fluidisation and treatment gas, discharge means located above the grid for discharging the treated fuel, wherein the fluidisation and treatment gas is supplied as a result of the combination of a first fluid circuit and a second fluid circuit separate from one another, each said first and second fluid circuits having their own gas-supply source and both opening inside the fluidised bed, wherein the first fluid circuit of fluidisation and treatment gas includes an assembly of first channels defining a vertical blowing direction, and plural cavities, each said channel opening into the bottom of a respective one of said cavities, said cavities located adjacent to one another and each including a widened area at the top terminating in an upper orifice, said cavities defining said grid means, wherein the second fluid circuit includes plural second channels which pass through the grid means in gaps separating the cavities, each said second channel having an opening vertically spaced above the level of said grid means, and wherein the hearth further comprises plural covers, said second channels of the second circuit terminating above the grid means in upwardly open apertures underneath a respective one of said covers, wherein the second channels of the second fluid circuit terminate above the grid means and define apertures directed in a transverse direction to the vertical blowing direction of the first channels of the first circuit, wherein the total gas passage cross-section of the second channels of the second fluid circuit is at least equal to the total gas passage cross-section of the first channels of the first fluid circuit, wherein the total cross-section of the upper orifices of the cavities is at least equal to the total cross-section of the second channels of the second fluid circuit.

5. Hearth for the fluidised-bed treatment of a fuel consisting of solid particles, comprising supply means for supplying the fuel to said hearth, a fixed lower grid means having gas passage channels for blowing a fluidisation and treatment gas, discharge means located above the grid for discharging the treated fuel, wherein the fluidisation and treatment gas is supplied as a result of the combination of a first fluid circuit and a second fluid circuit separate from one another, each said first and second fluid circuits having their own gas-supply source and both opening inside the fluidized bed, wherein the first fluid circuit of fluidisation and treatment gas includes an assembly of first channels defining a vertical blowing direction, and plural cavities, each said channel opening into the bottom of a respective one of said cavities, said cavities located adjacent to one another and each including a widened area at the top terminating in an upper orifice, said cavities defining said grid means, and wherein the second fluid circuit includes plural second channels which pass through the grid means in gaps separating the cavities, each said second channel having an opening vertically spaced above the level of said grid means, said hearth further comprising, plural covers, said second channels of the second circuit terminating above the grid means in upwardly open aperture underneath a respective one of said covers, wherein (a) the total cross-section of the upper orifices of the cavities is at least equal to the total cross-section of the second channels of the second fluid circuit, (b) the total gas passage cross-section of the second channels of the second fluid circuit is at least equal to the total gas passage cross-section of the first channels of the first fluid circuit.

6. Hearth according to claims 1, 2 or 3 wherein the total cross-section of the upper orifices of the cavities is at least equal to the total cross-section of the second channels of the second fluid circuit.

7. Hearth according to claims 1, 2, 3 or 4 used for combustion of the fuel wherein the first and second fluid circuits are both supplied with fluidisation and combustion gas containing oxygen.

8. Hearth as in claims 1 or 2 wherein said second fluid circuit is supplied with a flow of gas complementary to the flow of gas supplied to said first fluid circuit so that the total flow of gas through said first and second fluid circuits is sufficient to at least fluidize the bed of particles.

9. Hearth according to claims 1 or 2 wherein the total gas passage cross-section of the second channels of the second fluid circuit is least equal to the total gas passage cross-section of the first channels of the first fluid circuit.

* * * * *